United States Patent [19]

Cyba

[11] 3,873,567
[45] Mar. 25, 1975

[54] N-SUBSTITUTED POLYBROMOAROMATIC ORTHO-DICARBOXIMIDES
[75] Inventor: Henry A. Cyba, Evanston, Ill.
[73] Assignee: Universal Oil Products Company, Des Plaines, Ill.
[22] Filed: Sept. 5, 1968
[21] Appl. No.: 757,802

[52] U.S. Cl............. 260/326 C, 260/45.8, 252/8.1, 252/51, 106/15
[51] Int. Cl........................................... C07d 27/52
[58] Field of Search........ 260/326 C, 326 N, 326 X, 260/326

[56] References Cited
UNITED STATES PATENTS
2,443,888  6/1948  Bohrer............................... 260/326
2,508,418  5/1950  Strain et al. ......................... 260/326
3,208,939  9/1965  Latos et al............................. 252/34
3,294,816  12/1966  Latos et al........................... 260/326

Primary Examiner—Joseph A. Narcavage
Attorney, Agent, or Firm—James R. Hoatson, Jr.; Raymond H. Nelson; William H. Page, II

[57] ABSTRACT

Novel compositions of matter comprising N-substituted polybromoaromatic ortho-dicarboximides as exemplified by 1,4,5,6-tetrabromo-2,3-phthaloimide are useful as additives for plastics, polymers, resins, etc. whereby flameproof or fire-retardant properties are added thereto.

2 Claims, No Drawings

N-SUBSTITUTED POLYBROMOAROMATIC ORTHO-DICARBOXIMIDES

This invention relates to novel compositions of matter comprising N-substituted polybromoaromatic ortho-dicarboximides. More specifically, the invention relates to these compositions of matter and to the use thereof as additives to polymers or other chemical compounds whereby certain desirable physical characteristics are imparted to these compounds.

It has now been discovered that novel compositions of matter comprising, as hereinbefore set forth, N-substituted polybromoaromatic ortho-dicarboximides may be prepared by reacting a polybromo-substituted aromatic anhydride with an organic compound containing at least one primary nitrogen atom. These novel compositions of matter will, as hereinbefore set forth, be useful as additives to plastics, polymers, copolymers, terpolymers, resins, elastomers, rubbers, textiles and fibers, both naturally occurring and synthetic in nature, such as cotton, wool, Dacron, Nylon, Rayon, etc., coatings, paints, varnishes, leather, foams, cellulose acetate, butyrate, ethyl cellulose, cellulose propionate, etc., polyolefins such as polyethylene and polyethylene co-polymers, polypropylene and polypropylene co-polymers, polystyrenes, polystyrene co-polymers, polyvinyl acetate, or alcohol and co-polymers, polyesters, polyurethane, polyphenyl ethers, polycarbonates, polyamides, polyoxymethylenes, polyalkylene oxides such as polyethylene oxide, polyacrylates and co-polymers, polymethacrylates and co-polymers with styrene, butadiene, acrylonitrile, etc., epoxy resins, acrylonitrile-butadiene-styrene formulations (commonly known as ABS), polybutylene and acrylic ester modified styrene-acrylonitrile (ASA), methyl-methacrylate-styrene-butadiene terpolymer, etc. whereby the desirable physical characteristics of flameproofing or fire retardancy will be imparted to the aforementioned materials. This property will possess special advantages when preparing plastic or resinous material which will be utilized in places which may be subjected to excessive heat or possible flame such as architectural panels for construction work, wall plugs for electrical connections, ash trays, etc. In addition, the compound when used as a constituent of paint, lacquer, varnishes, or protective coatings, films, etc. will also impart a fire resistency to these compounds, and, therefore, render them commercially attractive as articles of commerce. Furthermore, the flame retardancy of foams such as the polyurethane foams will greatly enhance their use as insulating material or soundproofing material. Also, besides imparting the desirable physical characteristics of flame retardancy to the various articles of manufacture, the additives will render clear plastics or resins more stable to color changes and, therefore, will be an important component of these compounds whenever it is desirable that discoloration of the finished product is to be avoided or will tend to render such articles unuseable. It is also contemplated that the novel compositions of matter of this invention may also be used as an insecticide or as an ingredient in insecticidal formulations. Furthermore, the novel compositions of matter of this invention may also be used as high pressure additives for lubricating oils and greases, as effective releasing agents, etc.

It is therefore an object of this invention to provide novel compositions of matter which possess desirable physical properties.

Another object of this invention is to provide novel compositions of matter possessing the desirable physical characteristics of flameproofing and fire retardancy which may be used as additives in other chemical formulations.

In one aspect an embodiment of this invention resides in a novel compound having the formula:

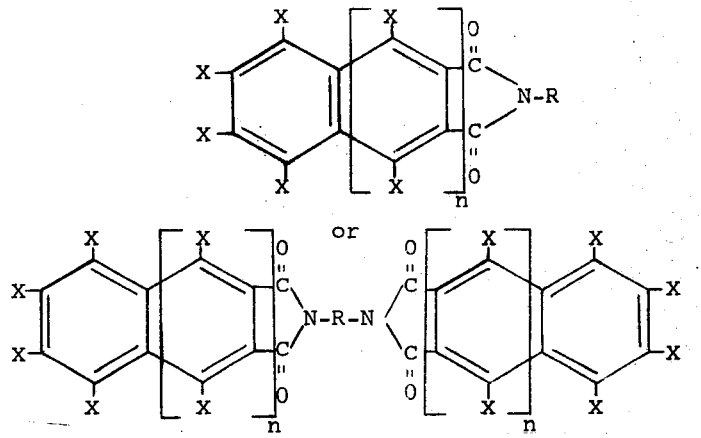

in which X is selected from the group consisting of hydrogen and bromine, at least two X's being bromine, R is selected from the group consisting of alkyl, aryl, cycloalkyl, alkaryl, aralkyl, alkylene, alkoxyaryl, haloaryl, amino, arylamino, alkylamino, aralkylamino, alkarylamino, aminoalkyl, aminoaryl, aminocycloalkyl, aminoaralkyl, alkylaminoalkyl, aryloxyaryl, arylalkylenearyl, and aminoalkaryl radicals, and $n$ ranges from zero to two.

Another embodiment of this invention is found in a novel composition of matter comprising a polymeric compound containing at least one reactive substituent and an N-substituted polybromoaromatic ortho-dicarboximide.

A specific embodiment of this invention comprises 1,4,5,6-tetrabromo-2,3-phthaloimide.

Another specific embodiment of this invention is found in a polymeric compound which comprises polypropylene and 1,4,5,6-tetrabromo-2,3-phthaloimide.

Other objects and embodiments will be found in the following further detailed description of the present invention.

As hereinbefore set forth the present invention is concerned with novel compositions of matter comprising N-substituted polybromoaromatic ortho-dicarboximides. In one embodiment these compounds are prepared by condensing a polybromo-substituted aromatic ortho-dicarboxylic acid or anhydride thereof which possesses the generic formula:

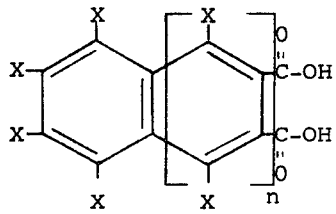 or 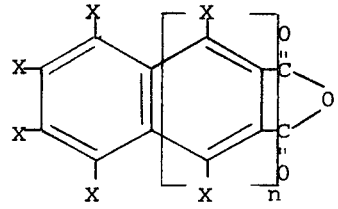

in which X is selected from the group consisting of hydrogen and bromine atoms, at least two of the X's being bromine, and *n* ranges from zero to two. These compounds are condensed with an amino compound of a type hereinafter set forth in greater detail. Specific examples of these polybromo-substituted ortho-dicarboxylic acids or anhydrides thereof will include 1,4-dibromophthalic acid, 1,4-dibromophthalic anhydride, 1,5-dibromophthalic acid, 1,5-dibromophthalic anhydride, 1,6-dibromophthalic acid, 1,6-dibromophthalic anhydride, 5,6-dibromophthalic acid, 5,6-dibromophthalic anhydride, 1,4,5-tribromophthalic acid, 1,4,5-tribromophthalic anhydride, 1,4,5,6-tetrabromophthalic acid, 1,4,5,6-tetrabromophthalic anhydride, 1,4-dibromo-2,3-naphthalenedicarboxylic acid, 1,4-dibromo-2,3-naphthalenedicarboxylic anhydride, 1,4,5,8-tetrabromo-2,3-naphthalenedicarboxylic acid, 1,4,5,8-tetrabromo-2,3-naphthalenedicarboxylic anhydride, 1,4,5,6,7,8-hexabromo-2,3-naphthalenedicarboxylic acid, 1,4,5,6,7,8-hexabromo2,3-naphthalenedicarboxylic anhydride, 1,4-dibromo2,3-anthracenedicarboxylic acid, 1,4-dibromo-2,3-anthracenedicarboxylic anhydride, 1,4,9-tetrabromo-2,3-anthracenedicarboxylic acid, 1,4,9-tetrabromo-2,3-anthracenedicarboxylic anhydride, 1,4,5,6,7,8,9,10-octabromo-2,3-anthracenedicarboxylic acid, 1,4,5,6,7,8,9,10-octabromo-2,3-anthracenedicarboxylic anhydride, etc. It is to be understood that the aforementioned polybromo-substituted aromatic dicarboxylic acids or anhydrides thereof are only representative of the type of compounds which may be used, and that the present invention is not necessarily limited thereto.

The above mentioned polybromo-substituted aromatic dicarboxylic acids or anhydrides thereof are condensed with an amino compound which contains at least one basic primary nitrogen atom and may also contain one or more nitrogen atoms in any feasible form in addition to the primary nitrogen. Theses compounds will have the formula:

in which R is selected from the group consisting of alkyl, aryl, cycloalkyl, alkaryl, aralkyl, alkylene, alkoxyaryl, haloaryl, amino, arylamino, alkylamino, aralkylamino, alkarylamino, aminoalkyl, aminoaryl, aminocycloalkyl, aminoaralkyl, aminoalkaryl, polyalkyleneamino, and polyalkylenepolyamino radicals.

Some representative illustrative examples of these compounds will include alkylmonoamines such as methylamine, ethylamine, propylamine, butylamine, the isomeric pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl amines, etc.; amines prepared from fatty acid derivatives such as tallow amine, hydrogenated tallow amine, lauryl amine, stearyl amine, oleyl amine, linoleyl amine, etc.; alkylene polyamines such as ethylenediamine, propylenediamine (diaminopropane), butylenediamine, pentylenediamine, hexylenediamine, etc., N-alkyl substituted diamino alkanes such as N-methyldiaminoethane, N-ethyl-diaminoethane, N-methyl-1,3-diaminopropane, N-ethyl-1,3-diaminopropane, other N-alkyl-1,3-diaminopropanes in which the alkyl group may contain carbon atoms ranging from 2 up to about 20 carbon atoms and thus the alkyl group is selected from hexyl, heptyl, octyl, nonadecyl, undecyl, dodecyl, tridecyl, tetradecyl, etc. radicals. In addition, other N-alkyl diaminoalkanes such as the N-alkyl-1,4-diaminobutanes, N-alkyl-1,2-diaminopentanes, N-alkyl-1,5-diaminopentanes, N-alkyl-1,2-diaminohexanes, N-alkyl-1,3-diaminohexanes, N-alkyl-1,6-diaminohexanes, etc. may also be used.

Other amine compounds which may be used include polyalkylenepolyamines and N-substituted derivatives thereof including diethylenetriamine, dipropylenetriamine, dibutylenetriamine, dipentylenetriamine, dihexylenetriamine, diheptylenetriamine, dioctylenetriamine, etc., triethylenetetramine, tripropylenetetramine, tributylenetriamine, tripentylenetriamine, trihexylenetetramine, triheptylenetetramine, trioctylenetetramine, etc., tetraethylenepentamine, tetrapropylenepentamine, tetrapentylenepentamine, tetrahexylenepentamine, tetraheptylenepentamine, etc., pentaethylenehexamine, pentapropylenehexamine, pentabutylenehexamine, pentapentylenehexamine, etc.

It is also contemplated within the scope of this invention that N-alkyl-1,3-diaminopropanes in which the alkyl group contains from about eight to about 25 carbon atoms of which a number of the class are commercially available may also be utilized although not necessarily with equivalent results. For example, certain amine compounds known as "Duomeen T" and "Diam 26" in which the alkyl group is derived from tallow and contains from about 12 to about 20 carbon atoms per group and mostly 16 to 18 carbon atoms per group may be utilized as the amine starting material in the present invention.

Aromatic amines which may be used include monoamines such as aniline, the toluidines, the xylidines, naphthylamine, anthracylamine, etc.; aromatic polyamines such as o-phenylenediamine, m-phenylenediamine, p-phenylenediamine, 1,2-naphthalenediamine, 1,4-naphthalenediamine, 1,5-naphthalenediamine, 1,6-naphthalenediamine, 1,7-naphthalenediamine, 1,8-naphthalenediamine, 2,3-naphthalenediamine, 2,6-naphthalenediamine, 2,7- naphthalenediamine, 1,2,3-triaminobenzene, 1,2,4-triaminobenzene, 1,3,5-triaminobenzene, etc., polyarylenepolyamines such as diaminodiphenylamine, diaminodinaphthylamine, aminodinaphthylamine, etc.; cycloalkylamines such as cyclobutylamine, cyclopentylamine, cyclohexylamine, cycloheptylamine, cyclooctylamine, 2-methylcyclobutylamine, 3-methylcyclobutylamine, 3-methylcyclopentylamine, 2-methylcyclohexylamine, 4-methylcyclohexylamine, etc., cycloalkyleneamines such as the isomeric cyclobutyldiamines, cyclopentyldiamines, cyclohexyldiamines, cycloheptyldiamines, cyclooctyldiamines, etc., polyalkylenepolycycloalkylenepolyamines such as diaminodicyclobutylamine, diaminodicyclopentylamine, diaminodicyclohexylamine, the tricycloalkyltetramines, the tetracycloalkylpentamines, etc.

It is also contemplated within the scope of this invention that certain polyamino compounds which contain at least three nitrogen atoms in the molecule may also be condensed with the aforementioned acids or anhydrides thereof. Such compounds will include guanidine, biguanidine, carbazide, semicarbazide, thiocarbazide, thiosemicarbazide, substituted guanidines such as methylguanidine, propylguanidine, diethylguanidine, phenylguanidine, tolylguanidine, diphenylguanidine, ditrolylguanidine, methoxyguanidine, dimethoxyguanidine, phenoxyguanidine, chloroguanidine, bromoguanidine, chlorophenylguanidine, chloromethylguanidine, di-(chloromethyl)-guanidine, etc.; substituted biguanidines such as methylbiguanidine, propylbiguanidine, diethylbiguanidine, phenylbiguanidine, tolylbiguanidine, diphenylbiguanidine, ditolylbiguanidine, methoxybiguanidine, dimethoxybiguanidine, phenoxybiguanidine, chlorobiguanidine, bromobiguanidine, chlorophenylbiguanidine, chloromethylbiguanidine, di-(chloromethyl)-biguanidine, etc.; substituted carbazides such as methylcarbazide, propylcarbazide, diethylcarbazide, phenylcarbazide, tolylcarbazide, diphenylcarbazide, ditolylcarbazide, methoxycarbazide, dimethoxycarbazide, phenoxycarbazide, chlorocarbazide, bromocarbazide, chlorophenylcarbazide, chloromethylcarbazide, di-(chloromethyl)-carbazide, etc.; substituted semicarbazides such as methylsemicarbazide, propylsemicarbazide, diethylsemicarbazide, phenylsemicarbazide, tolylsemicarbazide, diphenylsemicarbazide, ditolylsemicarbazide, methoxysemicarbazide, dimethoxysemicarbazide, phenoxysemicarbazide, chlorosemicarbazide, bromosemicarbazide, chlorophenylsemicarbazide, chloromethylsemicarbazide, di-(chloromethyl)-semicarbazide, etc.; substituted thiocarbazides such as methylthiocarbazide, propylthiocarbazide, diethylthiocarbazide, phenylthiocarbazide, tolylthiocarbazide, dephenylthiocarbazide, ditolylthiocarbazide, methoxythiocarbazide, dimethoxythiocarbazide, phenoxythiocarbazide, chlorothiocarbazide, bromothiocarbazide, chlorophenylthiocarbazide, chloromethylthiocarbazide, di-(chloromethyl)-thiocarbazide, etc.; substituted thiosemicarbazides such as methylthiosemicarbazide, propylthiosemicarbazide, diethylthiosemicarbazide, phenylthiosemicarbazide, tolylthiosemicarbazide, cyclohexylthiosemicarbazide, dibenzylthiosemicarbazide, dicyclohexylthiosemicarbazide, ethoxythiosemicarbazide, diethoxythiosemicarbazide, diphenoxythiosemicarbazide, dichlorothiosemicarbazide, dibromothiosemicarbazide, di-(chlorophenyl)-thiosemicarbazide, chloroethylthiosemicarbazide, di-(chloromethyl)-thiosemicarbazide, etc. It is to be understood that the aforementioned compounds are only representative of the class of compounds falling within the generic formula hereinbefore set forth, and that the present invention is not necessarily limited thereto.

The desired novel compositions of matter of the present invention may be prepared by condensing a polybromosubstituted aromatic ortho-dicarboxylic acid or anhydride thereof of the type hereinbefore set forth in greater detail with an amine compound containing at least one primary nitrogen atom at condensation conditions. The condensation conditions which are to be employed will include a temperature in the range of from about ambient (about 25°C.) up to about 250°C. or more and at pressures which may range from atmospheric up to about 50 atmospheres or more. If elevated temperatures in the upper limit of the aforementioned range are employed, it is contemplated that the reaction will be effected at superatmospheric pressures, said superatmospheric pressures being generated by the introduction of a substantially inert gas such as nitrogen into the reaction zone, the pressure which is used being that which is sufficient to maintain a major portion of the reactants or solvent in the liquid phase. Generally speaking, the condensation is usually effected in the presence of a substantially inert organic solvent, and when utilizing such a solvent, the temperature which is then employed may be the reflux temperature of said solvent. Specific examples of the type of solvent which may be employed will include aromatic hydrocarbons such as benzene, toluene, o-xylene, m-xylene, p-xylene, ethylbenzene, etc.; aliphatic anc cycloaliphatic paraffins such as n-pentane, n-hexane, n-heptane, cyclopentane, methylcyclopentane, etc.; alcohols such as methyl alcohol, ethyl alcohol, n-propyl alcohol, isopropyl alcohol, etc.; ethers such as dimethyl ether, diethyl ether, dipropyl ether, the dimethyl ether of diethylene glycol, the diethyl ether of diethylene glycol, dioxane, etc.; various esters and chlorinated hydrocarbons, etc. The residence time during which the condensation is effected will be of a duration which is sufficient to effect a substantially complete reaction and may vary from about 0.5 up to about 10 hours or more, the reaction being substantially complete when the theoretical amount of water which has been formed during the condensation has been removed. The mole ratios of the reactants which are present will depend upon whether a mono-imide or bis-imide of the polyhalosubstituted aromatic ortho-dicarboxylic acid or anhydride thereof constitutes the desired product. For example, when a bis-imide comprises the desired product, the aforementioned polybromo-substituted ortho-dicarboxylic acid or anhydride thereof will be present in a mole excess over the amine compound, said excess being in a range of from about 2:1 up to about 10:1 moles of acid or anhydride per mole of amine compound. Likewise, the selection of the amine compound will also be dependent upon whether a mono-imide or bis-imide constitutes the desired product. When a bis-imide is desired, the amine compound which is used must, of necessity, contain two primary nitrogen atoms and be present in a mole amount less than the acid or anhydride.

The process of the present invention may be effected in any suitable manner and may comprise either a batch or continuous type operation. For example, when a batch type operation is used, a quantity of the particular polybromo-substituted aromatic ortho-dicarboxylic acid or anhydride thereof and the amine compound of the type hereinbefore set forth in greater detail is placed in an appropriate apparatus along with, if so desired, a substantially inert organic solvent. The apparatus, which may comprise a condensation flask or, if superatmospheric pressures are to be used, a rotating autoclave, is provided with heating means and a means of drawing the water of reaction which is formed, a particular example of these means being a Dean-Stark water trap. The apparatus is then heated to the desired operating temperature which, if a solvent is used, is the reflux temperature thereof, and allowed to proceed for a predetermined residence time. This time is calculated as when the theoretical amount of water which has formed has been removed. At the end of this time, the apparatus and the reaction mixture is allowed to cool to room temperature, the excess pressure, if any, is vented and the reaction product is recovered. The product is then separated from any solvent by conventional means such as evaporation, suction, filtration, etc. and recovered. Thereafter, the product may be subjected to fractional distillation under reduced pressure whereby separation from any unreacted starting materials and/or side products which have formed during the reaction is effected.

It is also contemplated within the scope of this invention that a continuous manner of operation may be employed. When such a type of operation is used, the starting materials comprising the acid or anhydride and the amine compound are continuously charged to a reactor which is maintained at the proper operating conditions of temperature and pressure. In the event that a solvent is to be employed, one or both of the reactants may be dissolved in the solvent prior to entry into said reactor. Alternatively speaking, the solvent may be charged to the reactor in a single stream, if so desired. Upon completion of the desired residence time, the reactor effluent is continuously withdrawn and the reaction product is separated from the water of reaction which has been formed and from the solvent by conventional means. In addition, the reaction product is also separated from any unreacted starting materials which may still be present in the effluent, the latter being recycled to form a portion of the feed stock. The desired product comprising the N-substituted polybromoaromatic ortho-dicarboximides are then recovered.

Examples of the novel compositions of matter of the present invention comprise N-substituted polybromoaromatic ortho-dicarboximides or bis-imides which possess the generic formulae:

in which X is selected from the group consisting of hydrogen and bromine, at least two X's being bromine, R is selected from the group consisting of alkyl, aryl, cycloalkyl, alkaryl, aralkyl, alkylene, alkoxyaryl, haloaryl, amino, arylamino, alkylamino, aralkylamino, alkarylamino, aminoalkyl, aminoaryl, aminocycloalkyl, aminoaralkyl, and aminoalkaryl radicals and $n$ ranges from zero to two. Some representative illustrative examples of these compounds will include 1,4-dibromo-2,3-phthaloimide, 1,4,5-tribromo-2,3-phthaloimide, 1,4,5,6-tetrabromo-2,3-phthaloimide, N-methyl-1,4-dibromo-2,3-phthaloimide, N-methyl-1,4,5,6-tetrabromo-2,3-phthaloimide, N-ethyl-1,4-dibromo-2,3-phthaloimide, N-propyl-1,4,5,6-tetrabromo-2,3-phthaloimide, N-phenyl-1,4,5,6-tetrabromo-2,3-phthaloimide, N-benzyl-1,4,5,6-tetrabromo-2,3-phthaloimide, N-p-tolyl-1,4,5,6-tetrabromo-2,3-phthaloimide, N-cyclopentyl-1,4,5,6-tetrabromo-2,3-phthaloimide, N-cyclohexyl-1,4,5,6-tetrabromo-2,3-phthaloimide, N-allyl-1,4,5,6-tetrabromo-2,3-phthaloimide, N-p-methoxyphenyl-1,4,5,6-tetrabromo-2,3-phthaloimide, N-p-ethoxyphenyl-1,4,5,6-tetrabromo-2,3-phthaloimide, N-p-bromophenyl-1,4,5,6-tetrabromo-2,3-phthaloimide, N-(2,4-dibromophenyl)-1,4,5,6-tetrabromo-2,3-phthaloimide, N-amino-1,4,5,6-tetrabromo-2,3-phthaloimide, N-p-anilino-1,4,5,6-tetrabromo-2,3-phthaloimide, N-methyleneamino-1,4,5,6-tetrabromo-2,3-phthaloimide, N-ethyleneamino-1,4,5,6-tetrabromo-2,3-phthaloimide, N-propyleneamino-1,4,5,6-tetrabromo-2,3-phthaloimide, N-diethylenediamino-1,4,5,6-tetrabromo-2,3-phthaloimide, N-triethylenetriamino-1,4,5,6-tetrabromo-2,3-phthaloimide, N-cyclohexylamino-1,4,5,6-tetrabromo-2,3-phthaloimide, N-propyl-1,4,5,6,7,8-hexabromo-2,3-dicarboxynaphthylimide, N-phenyl-1,4,5,6,7,8-hexabromo-2,3-dicarboxynaphthylimide, N-benzyl-1,4,5,6,7,8-hexabromo-2,3-dicarboxynaphthylimide, N-p-tolyl-1,4,5,6,7,8-hexabromo-2,3-dicarboxynaphthylimide, N-cyclopentyl-1,4.5,6,7,8-hexabromo-2,3-dicarboxynaphthylimide, N-cyclohexyl-1,4,5,6,7,8-hexabromo-2,3-dicarboxynaphthylimide, N-allyl-1,4,5,6,7,8-hexabromo-2,3-dicarboxynaphthylimide, N-p-methoxyphenyl-1,4,5,6,7,8-dicarboxynaphthylimide, N-p-ethoxyphenyl-1,4,5,6,7,8-hexabromo-2,3-dicarboxynaphthylimide, N-p-bromophenyl-1,4,5,6,7,8-hexabromo-2,3-dicarboxynaphthylimide, N-(2,4-dibromophenyl)-1,4,5,6,7,8-hexabromo-2,3-dicarboxynaphthylimide, N-amino-1,4,5,6,7,8-hexabromo-2,3-dicarboxynaphthylimide, N-p-anilino-1,4,5,6,7,8-hexabromo-2,3-dicarboxynaphthylimide, N-methyleneamino-1,4,5,6,7,8-

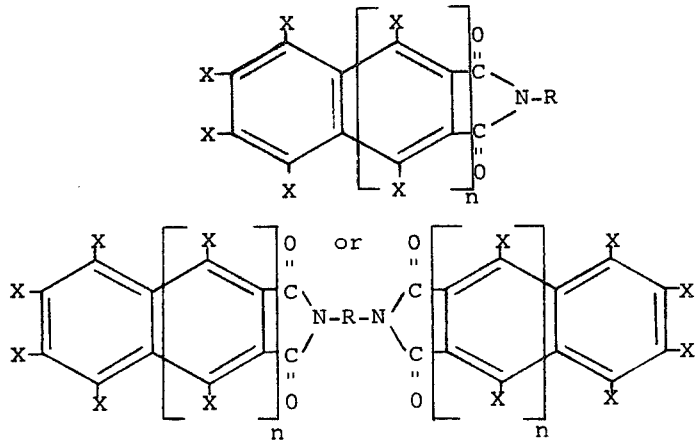

hexabromo-2,3-dicarboxynaphthylimide, N-ethyleneamino-1,4,5,6,7,8,-hexabromo-2,3-dicarboxynaphthylimide, N-propyleneamino-1,4,5,6,7,8-hexabromo-2,3-dicarboxynaphthylimide, N-diethylenediamino-1,4,5,6,7,8-hexabromo-2,3-dicarboxynaphthylimide, N-triethylenetriamino-1,4,5,6,7,8-hexabromo-2,3-dicarboxynaphthylimide, N-cyclohexylamino-1,4,5,6,7,8-hexabromo-2,3-dicarboxynaphthylimide, N-propyl-1,4,5,6,7,8,9,10-octabromo-2,3-dicarboxyanthracylimide, N-phenyl-1,4,5,6,7,8,9,10-octabromo-2,3-dicarboxyanthracylimide, N-benzyl-1,4,5,6,7,8,9,10-octabromo-2,3-dicarboxyanthracylimide, N-p-tolyl-1,4,5,6,7,8,9,10-octabromo-2,3-dicarboxyanthracylimide, N-cyclopentyl-1,4,5,6,7,8,9,10-octabromo-2,3-dicarboxyanthracylimide, N-cyclohexyl-1,4,5,6,7,8,9,10-octabromo-2,3-dicarboxyanthracylimide, N-allyl-1,4,5,6,7,8,9,10-octabromo-2,3-dicarboxyanthracylimide, N-p-methoxyphenyl-1,4,5,6,7,8,9,10-octabromo-2,3-dicarboxyanthracylimide, N-p-ethoxyphenyl-1,4,5,6,7,8,9,10-octabromo-2,3-dicarboxyanthracylimide, N-p-bromophenyl-1,4,5,6,7,8,9,10-octabromo-2,3-dicarboxyanthracylimide, N-(2,4-dibromophenyl)-1,4,5,6,7,8,9,10-octabromo-2,3-dicarboxyanthracylimide, N-amino-1,4,5,6,7,8,9,10-octabromo-2,3-dicarboxyanthracylimide, N-p-anilino-1,4,5,6,7,8,9,10-octabromo-2,3-dicarboxyanthracylimide, N-methyleneamino-1,4,5,6,7,8,9,10-octabromo-2,3-dicarboxyanthracylimide, N-ethyleneamino-1,4,5,6,7,8,9,10-octabromo-2,3-dicarboxyanthracylimide, N-propyleneamino-1,4,5,6,7,8,9,10-octabromo-2,3-dicarboxyanthracylimide, N-diethylenediamino-1,4,5,6,7,8,9,10-octabromo-2,3-dicarboxyanthracylimide, N-triethylenetriamino-1,4,5,6,7,8,9,10-octabromo-2,3-dicarboxyanthracylimide, N-cyclohexylamino-1,4,5,6,7,8,9,10-octabromo-2,3-dicarboxyanthracylimide, N,N'-bis(1,4,5,6-tetrabromo-2,3-phthaloimide), 1,2-bis-N,N'-(1,4,5,6,-tetrabromo-2,3-phthaloimide)ethylene, 1,3-bis-N,N'-(1,4,5,6-tetrabromo-2,3-phthaloimide)propylene, 1,4-bis-N,N'-(1,4,5,6-tetrabromo-2,3-phthaloimide)butylene, 1,4-N,N'-(1,4,5,6-tetrabromo-2,3-phthaloimide)benzene, 1,4-N,N'-(1,4,5,6-tetrabromo-2,3-phthaloimide)cyclohexyl, guanyl-1,4,5,6-tetrabromo-2,3-phthaloimide, guanyl-1,4,5,6,7,8-hexabromo-2,3-dicarboxynaphthylimide, guanyl-1,4,5,6,7,8,9,10-octabromo-2,3-dicarboxyanthracylimide, etc. While the aforementioned specific compounds have recited mainly compounds which contain bromo substituents on the 1,4,5,6 carbon atoms, it is to be understood that other compounds containing bromine substituents in different positions including 1,4,5-tribromo and 1,4-dibromo compounds also fall within the generic formulae hereinbefore set forth, and are considered to be a part of this invention. However, it is to be understood that these compounds are only representative of the class of compounds which may be used and that the present invention is not necessarily limited thereto.

As hereinbefore set forth, the novel compositions of matter of the present invention may be utilized as additives for plastics, resins, polymers, co-polymers, textiles, naturally occurring products such as leather, wood, or paints, coatings, etc. For Example, the N-substituted polybromoaromatic ortho-dicarboximides may be used as additives with polymeric olefins such as polypropylene whereby the final product will possess advantageous physical properties such as an increased stability against deterioration, weathering, and aging which has been induced by chemical, physical, biological agents or radiation. In addition, the polyolefins will have a higher ignition point as well as a high degree of flame retardancy. The carboximides may be added to the polyolefins such as polypropylene in a range of from about 5% to about 50% by weight of the polymeric material to be treated. Thereafter, it will be found that the oxygen index will have been increased while the burning rate will have decreased. Examples of other polymeric products which may be treated with the carboximides of the present invention will include epoxy resins such as the condensation product of epichlorohydrin and bis-phenol-A. The epoxy resins, in a cured state, will usually be thermal-plastic and may range from low viscosity liquids to a high melting point brittle solid. The resins may be cured by utilizing a curing agent such as phthalic anhydride and thereafter admixing the resultant mixture with a carboximide of the type hereinbefore set forth. Thereafter, the mixture will be cured by treatment at an elevated temperature for a predetermined period of time. The resultant product will have the physical characteristics thereof altered to their desirable values as pertains to color stability, flame retardancy, etc. and thus may be utilized for various purposes such as floor surfacings, coatings, etc. Other types of polymeric compounds which may be treated with the novel compositions of matter of the present invention will include polyphenyl ethers (polyphenylene oxides) which have been modified by treatment with styrene, polycarbonates, polyesters, polyurethane foams, etc.

The following examples are given to illustrate the process of the present invention which, however, are not intended to limit the generally broad scope of the present invention in strict accordance therewith.

EXAMPLE I

In this example, 154.6 grams (0.3 mole) of 1,4,5,6-tetrabromophthalic anhydride and 39 grams of a 30% ammonium hydroxide solution were placed in a reaction vessel provided with a Dean-Stark water trap. In addition, the two compounds produced an exothermic reaction. The mixture also contained 39 grams of methyl alcohol to facilitate the mixing of the reactants. An additional 100 grams of methyl alcohol was added and the mixture was heated to the reflux temperature of the alcohol. Following this, about 200 cc of toluene was added after about 2 hours of refluxing at the reflux temperature of methyl alcohol. The water of condensation was continuously collected in the Dean-Stark tube and 200 grams of xylene was added to raise the temperature of the reflux. The resulting precipitate, after a residence time of over 12 hours, was filtered off and extracted with hot nitrobenzene. The precipitate was again filtered, washed with hot xylene and thereafter with benzene. The resulting crystals had no melting point up to 370°C. and sublimed over that temperature. The crystals were subjected to analysis with the following results:

Calculated for $C_8Br_4O_2HN$: Br, 69.2%; N, 3.03%.
Found: Br, 66.8%; N, 3.38%.
The crystals comprised 1,4,5,6-tetrabromo-2,3-phthaloimide as a major product.

EXAMPLE II

In this example 156.6 grams (0.3 mole) of 1,4,5,6-tetrabromophthalic anhydride and 200 grams of benzene were placed in a condensation apparatus provided with heating means, stirring means, and a Dean-Stark water trap. Following this, 43.3 grams (0.3 mole) of n-octylamine, which were dissolved in 100 grams of benzene, were added dropwise to the solution while thoroughly admixing and refluxing the reaction mixture. Upon completion of the reaction, as evidenced by the collection of water of condensation, heating was discontinued. The precipitate which formed upon cooling was filtered off and washed with n-heptane and n-pentane. Upon drying, it was found that the melting point of the crystals was 176°–180°C. capillary. The crystals which comprised n-octyl-1,4,5,6-tetrabromo-2,3-phthaloimide were subjected to analysis with the following results:

Calculated for $C_{16}H_{17}Br_4O_2N$: Br, 55.7%; N, 2.44%.
Found: Br, 54.8%; N, 2.36%.

EXAMPLE III

A mixture of 15.6 grams (0.3 mole) of 1,4,5,6-tetrabromophthalic anhydride and 200 grams of toluene were heated to reflux. Following this, 48.1 grams (0.3 mole) of N-sec-hexylethylenediamine dissolved in 100 grams of toluene was slowly added to the solution. The mixture was refluxed for a period of about 6 hours during which time the water of condensation which formed was collected in a Dean-Stark tube. The yellow precipitate which formed was filtered off and washed with benzene. It was composed of unreacted tetrabromophthalic anhydride. Upon the addition of benzene to the xylene solution, 25 grams of product melting at 139°–143°C. precipitated. On further dilution with n-pentane, additional crystals precipitated. The crystals which were obtained from this treatment had a melting point of 139°–141°C. The crystals which comprised N-3-azanonyl-1,4,5,6-tetrabromo-2,3-phthaloimide were analyzed with the following results:

Calculated for $C_{16}H_{18}Br_4O_2N_2$: Br, 54.4%; N, 4.76%.
Found: Br, 54.9%; N, 4.69%.

EXAMPLE IV

In this example 154.6 grams (0.3 mole) of 1,4,5,6-tetrabromophthalic anhydride, 43.3 grams (0.3 mole) of N-octylamine and 200 cc of toluene are refluxed for a period of about 5.5 hours. At the end of this time, the crystalline precipitate which forms is filtered off. The mother liquor, upon cooling, yields additional crystals which are treated with n-pentane. The crystals, upon being treated with n-heptane and recrystallized, comprise N-octyl-1,4,5,6-tetrabromo-2,3-phthaloimide.

EXAMPLE V

In this example 232 grams (0.5 mole) of 1,4,5,6-tetrabromophthalic anhydride, 200 grams of absolute methyl alcohol and 8.4 grams of 95% hydrazine dissolved in 50 grams of absolute methyl alcohol were placed in a condensation apparatus provided with a Dean-Stark water collection tube as well as heating and stirring means. The hydrazine-methyl alcohol solution was added during a period of 2 minutes to the anhydride mixture, the reaction being exothermic in nature. After a period of 3 hours at reflux, the crystalline material which formed was recovered by filtration and dried. The crystals did not melt below 370°C. nor was there any sublimation or change in color. The crystals which comprised N,N'-bis-(1,4,5,6-tetrabromo-2,3-phthaloimide) were analyzed with the following results:

Calculated for $C_{16}Br_8O_4N_2$: Br, 69.2%; N, 3.03%.
Found: Br, 67.7%; N, 3.15%.

EXAMPLE VI

In this example 154.6 grams (0.3 mole) of 1,4,5,6-tetrabromophthalic anhydride was suspended in 200 grams of toluene in a condensation flask similar to that hereinbefore described. Following this, 53 grams (0.3 mole) of N-sec-butyldiethylenetriamine dissolved in 100 grams of toluene were added dropwise to the mixture and suspended solution at almost the reflux temperature of the toluene within a period of 3 minutes. A precipitate started to form immediately and reflux was continued for a period of about 6 hours. At the end of this time, heating was discontinued and the precipitate was filtered. The precipitate was treated with benzene and n-pentane. The recrystallized product which comprised N-3,6-diazadecyl-1,4,5,6-tetrabromo-2,3-phthaloimide was analyzed with the following results:

Calculated for $C_{16}H_{19}Br_4O_4N_3$: Br, 52.8%; N, 6.97%.
Found: Br, 50.5%; N, 7.36%.

EXAMPLE VII

In this example a mixture of 154.6 grams (0.3 mole) of 1,4,5,6-tetrabromophthalic anhydride and 200 grams of toluene is placed in a condensation flask. To this flask is added 9 grams (0.15 mole) of 1,2-ethylenediamine. The flask is heated to the reflux temperature of toluene and maintained thereat for a period of about 6 hours, during which time the water of condensation which forms is continuously removed. At the end of this time, the precipitate which forms is separated by filtration, washed with benzene, dried and recrystallized from n-pentane. The resultant crystals will comprise the desired product, namely, 1,2-bis-N,N'-(1,4,5,6-tetrabromo-2,3-phthaloimide)ethylene.

EXAMPLE VIII

In this example a mixture of 213 grams (0.3 mole) of 1,4,5,6,7,8-hexabromo-2,3-dicarboxynaphthalene anhydride, 300 cc of toluene and 39 grams of a 30% ammonium hydroxide solution are placed in a reaction vessel provided with heating means, stirring means, and a Dean-Stark water trap. The reaction is exothermic in nature. Following this, the mixture is heated to the reflux temperature of the toluene and maintained thereat for a period of about 6 hours. At the end of this time, all of the water of condensation which forms is collected and distilled off. The precipitate which forms during the reaction is separated by filtration, washed with benzene, and thereafter with n-pentane. The desired product, comprising 1,4,5,6,7,8-hexabromo-2,3-dicarboxynaphthylimide, is separated and recovered.

EXAMPLE IX

A liquid epoxy resin having an epoxide equivalent weight of 190 and known in the trade as "Epon 828" is admixed with phthalic anhydride and n-3-azanonyl-1,4,5,6-tetrabromo-2,3-phthaloimide. The resulting mixture is then heated until said mixture becomes homogeneous and is poured into molds which are prepared from glass sheets using Teflon spacers. In addition, a mold release agent is also used to facilitate removal of the cured resins from the mold. The molds are placed in an air-circulating oven and ollowed to cure for a period of about 6 hours at a temperature of 110°C. By utilizing various widths of spacers, sheets of various thickness are prepared. The sheets are then removed from the mold, cut into strips, and are evaluated for flame retardancy. In addition to possessing excellent heat distortion temperatures and hardness, as measured by a Shore durometer, the cured resin will be found to be self-extinguishing when removed from the direct action of a flame.

EXAMPLE X

In like manner, a mixture is made by admixing a polymer comprising polyphenyl ether (polyphenylene oxide) which has been modified with styrene and N-octyl-1,4,5,6-tetrabromo-2,3-phthaloimide, said compounds being admixed at an elevated temperature in order to insure that the mixture is homogeneous. After the mixture is injected into molds and allowed to cool, the resulting compositions of matter are removed and, upon testing, will be found to be self-extinguishing when removed from the direct action of a flame.

EXAMPLE XI

In this example, a mixture comprising polypropylene and 1,4,5,6-tetrabromo-2,3-phthaloimide are milled together at an elevated temperature of about 185°C. The resultant composition of matter when tested for flammability will show that the oxygen index (a molfraction of oxygen needed to sustain flame) is raised and the burning rate in air, as measured by seconds by inch, will be decreased.

Likewise, polycarbonates, when treated with compositions of matter comprising N-polyhalo-substituted aromatic dicarboximides will also exhibit flame-retardant properties, the treated polymers being self-extinguishing when removed from the action of a flame. In addition, the aforesaid compounds including, but not limited to, the epoxy resins, polyphenyl ethers, polycarbonates, polyolefins, polyesters, polyacrylates, which are treated by the addition of the dicarboximides herein described in greater detail, will also exhibit greater stability as regards color when exposed to the direct action of sunlight over an extended period of time.

I claim as my invention:

1. A compound having the formula

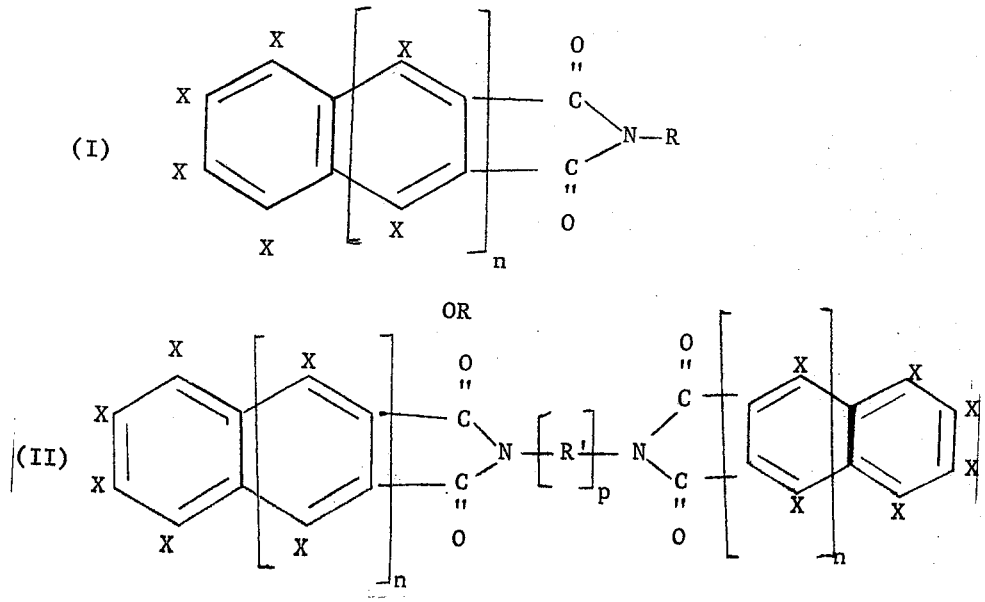

in which X is hydrogen or bromine, at least two X's being bromine; R is selected from the group consisting of a. alkyl of from one to 20 carbon atoms,
b. unsubstituted of nuclearly substituted carbocyclic aryl having from one to three condensed rings and in which the nuclear substituents are one or two in number and are selected from the group consisting of lower alkyl, lower alkoxy, —Br and —NH$_2$,
c. unsubstituted or substituted cycloalkyl having from four to eight carbon atoms in the ring and in which the substituent is selected from the group consisting of lower alkyl and —NH$_2$,
d. benzyl,
e. —NH$_2$,
f. —(CH$_2$)$_x$ NH—A in which A is hydrogen or alkyl of from one to 20 carbon atoms and $x$ ranges from two to six;
g. —R″—(NH—R″—)$_y$ NH$_2$ in which R″ is alkylene of from two to eight carbon atoms and $y$ ranges from one to four, and
h. guanyl;

R′ is selected from the group consisting of alkylene of from two to four carbon atoms, phenylene and cyclohexylene;

$n$ is one or two; and $p$ is zero or one.

2. The compound as set forth in claim 1, being 1,4,5,6,7,8-hexabromo-2,3-dicarboxynaphthylimide.

* * * * *